June 23, 1970   F. A. FERRARO   3,516,382
BLADE SUPPLY INDICATOR FOR RIBBON RAZOR MAGAZINE
Filed June 16, 1969   2 Sheets-Sheet 1
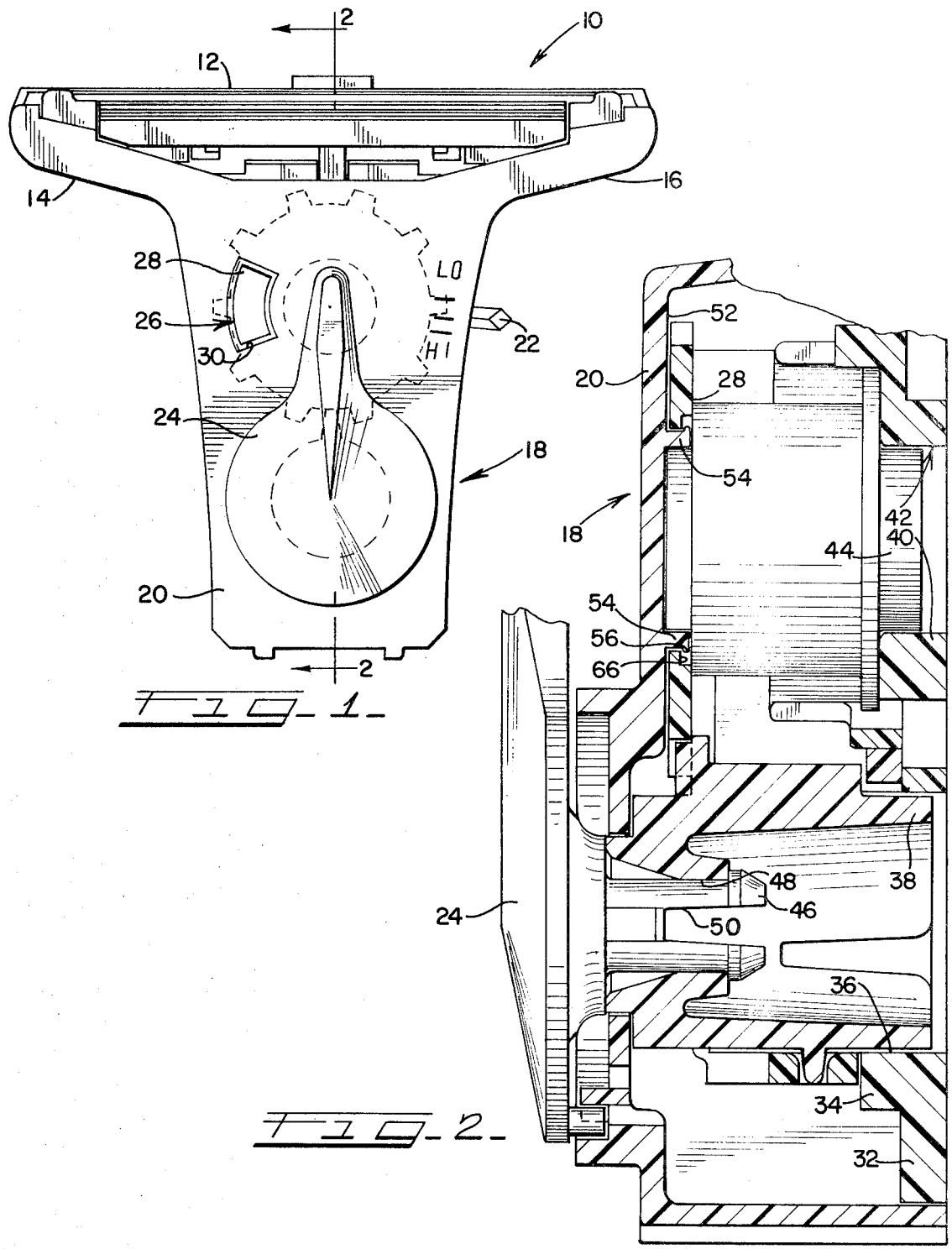
INVENTOR
FRANK A. FERRARO
BY
ATT'YS.

June 23, 1970   F. A. FERRARO   3,516,382
BLADE SUPPLY INDICATOR FOR RIBBON RAZOR MAGAZINE
Filed June 16, 1969   2 Sheets-Sheet 2
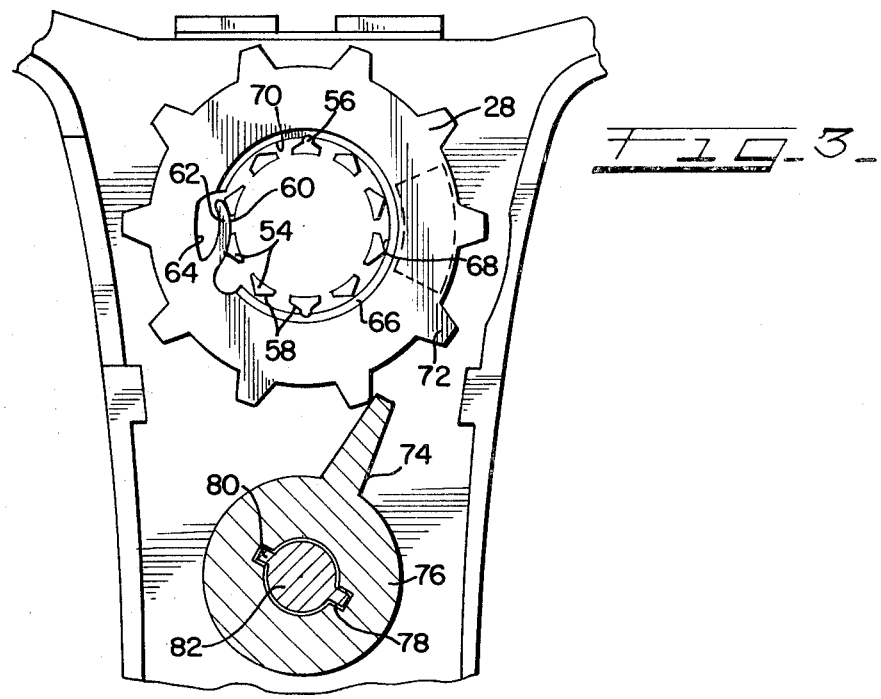
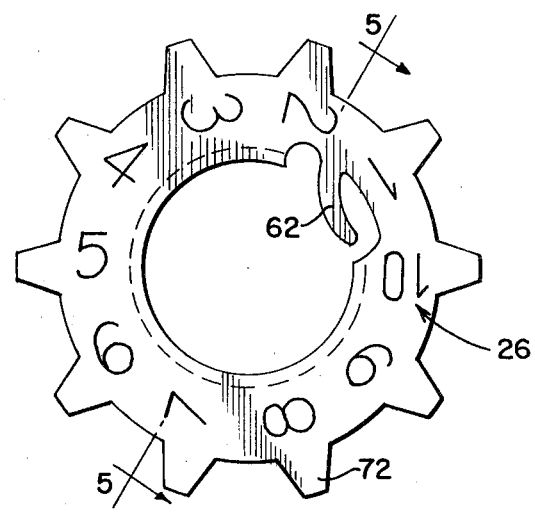
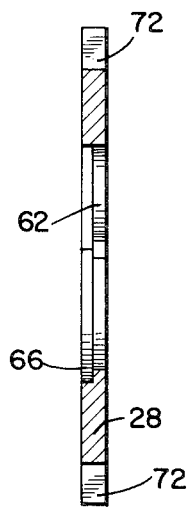
INVENTOR
FRANK A. FERRARO
BY
ATT'YS.

United States Patent Office 3,516,382
Patented June 23, 1970

3,516,382
BLADE SUPPLY INDICATOR FOR RIBBON RAZOR MAGAZINE
Frank A. Ferraro, Monroe, Conn., assignor to Eversharp, Inc., Milford, Conn., a corporation of Delaware
Filed June 16, 1969, Ser. No. 833,586
Int. Cl. B26b 21/26
U.S. Cl. 116—124                7 Claims

ABSTRACT OF THE DISCLOSURE

An indicator mechanism for a ribbon-type razor blade having a toothed indicator wheel driven by an associated drive member. The indicator unit contains a plurality of teeth, and an inwardly extending resilient tongue, the drive member contains a single tooth, and the indicator unit is mounted for rotation by means which define detents for receiving the tongue and insuring that the indicator will index to a desired position of rotation for each blade-advancing rotation of the lever unit.

BACKGROUND OF THE INVENTION

The present invention relates generally to ribbon-type magazine razors, and more particularly to mechanisms for indicating the amount of blade which remains in the magazine or which has been exhausted therefrom. Generally, the present invention provides a supply indicator which presents to the eye of the user a number representing the remaining blade supply through a viewing opening or window in the front face or cover of the magazine.

In the past, it has been customary to indicate the amount of blade supply remaining by imprinting the blade supply information on the blade itself for viewing through a side opening in the magazine, or by providing a driving wheel and a driven wheel having driven and driving circumferences differing by a length which is integrally divisible into the length of both surfaces. Thus, it is known to provide a 10- or 20-toothed wheel for actuation by a 9- or 18-toothed wheel in the case of a supply of 10 blades, whereby relative rotation of one wheel differs from that of the other by one tenth of one complete rotation.

It is also known that in the event only a small number of blade edges are to be dispensed either the numbers are closely spaced apart, or the difference in circumferences of the wheels must be large. Therefore, if the numbers are to be equally spaced such wheels must be made in different pairs for different blade lengths. A system such as this is not desirable for use with magazines holding only 2, 3 or 4 blade edges, as might be supplied in a low-priced magazine, or one used for sales promotion or like purposes.

It is therefore deired to retain the combined advantage of viewing from the front face, which is easily attained with the indicator wheel units of the prior art, with the simplicity of the blade marking concept or like more direct measurement or supply indicating methods. Accordingly, an object of the present invention is to provide a blade supply indicator mechanism which may be interchangeably used in magazines originally having different numbers of blade lengths therein for indicating the blade supply remaining in such magazines.

Another object is to provide an indicator mechanism of a simplified construction having a novel mounting system adapted to facilitate assembly of the components thereof.

A still further object is to provide a blade supply indicating mechanism in which one part is associated with a blade advancing lever and in which another part is driven thereby, and operates independently of any other mechanism.

Another object is to provide a blade supply indicator mechanism in which an indicator unit is advanced successively to a number of different positions or rotation by a single-toothed driving member operatively associated therewith.

Still another object of the invention is to provide a blade supply indicator mechanism in which the wheel unit containing blade supply indicia includes a resilient, integrally formed tongue for engagement with detents forming a part of the means for rotatably supporting the indicator.

Another object is to provide a supply indicator mechanism which is simple and economical, both in regard to the construction and assembly thereof.

The present invention achieves these objects and others which are inherent therein, by providing a blade supply indicator mechanism including a toothed wheel indicator unit adapted to be driven by a rotatable member having an associated blade advancing lever, and in which the indicator unit is rotatably supported by mounting means which define detents for receiving an inwardly extending resilient tongue formed on the inner surface of the indicator wheel for indexing the unit to a desired rotational position for each complete movement cycle of the advance lever.

The exact manner in which this invention achieves these objects, and others which are inherent therein, will become more apparent when reference is made to the following detailed description of the preferred embodiments of the invention, to the appended claims, and to the accompanying drawings, in which like reference numerals indicate the corresponding parts throughout.

BRIEF DESCRIPTION OF THE DRAWINGS

FIG. 1 shows a front elevational view of a razor magazine unit which includes the blade supply indicator mechanism of the invention;

FIG. 2 is a vertical sectional view, on an enlarged scale and with portions broken away, taken along line 2—2 of FIG. 1, showing the drive mechanism of the blade supply indicator;

FIG. 3 is a fragmentary view of the inside surface of the front cover portion of the blade magazine, showing the relation of the driving member to the driven indicator unit of the invention;

FIG. 4 is a front elevational view of the toothed wheel indicator unit of the invention; and FIG. 5 is a vertical sectional view of the indicator unit of FIG. 4, taken along the lines 5—5 thereof.

DESCRIPTION OF THE PREFERRED EMBODIMENTS OF THE INVENTION

Referring now to the drawings in greater detail, FIG. 1 shows a razor magazine assembly 10 containing a supply of a ribbon-type blade disposed across the bridge portion 12 thereof, and includes conventional, well known portions such as the arcuate end portions 14, 16 of the bridge 12, a body portion 18 having a front cover 20, an adjustment position selector lever 22 and an advancing lever 24 for advancing selected shaving edge portions of the blade across the bridge 12 in succession. A numeral 26 is displayed on a toothed wheel indicator unit 28, which may be viewed through an opening 30 in the front cover 20 of the magazine 10.

Referring now to FIG. 2, it can be seen that the body 18 of the magazine 10 includes a frame portion 32 having wall portions 34 defining a circular opening 36 for reception of a rotatable blade take-up spool 38, and additional wall portions 40 defining another opening or bore 42 for receiving a supply spool 44 and supporting it for rotation. The advancing lever 24 has an enlarged nose portion 46 extending through an opening 48 in the take-up spool 38, with the shank portion 50 supporting the nose 46 being of non-circular overall shape so as to provide positive drive means for the spool 38.

As shown in FIG. 2, the cover includes, on an inside rearwardly facing surface 52 thereof, a plurality of axially extending posts 54, one, two, or more of which may include small ears 56 extending radially outwardly therefrom. The posts 54 therefore serve as means for rotatably mounting the toothed wheel indicator unit 28. Referring now to FIG. 3, the relation of the posts 54 to one another may be seen, and the ears 56 are shown in a preferred form of the invention to be disposed on two diametrically oppositely disposed posts 54. The radially outwardly facing surfaces 58 of the posts 54 combine to define detents 60 for receiving a resilient tongue 62 which is integrally formed on an inner surface portion 64 of the wheel 28. A radially inner margin portion 66 of the wheel 28 is defined by a relieved or reduced depth section, and the ears 56 are shown to radially overlie at least a portion of this margin 66 to prevent axial movement of the wheel 28. The radially outer, pointed end portions 68 of the posts 54 define a circle which is engaged by the remaining inner surface portions 70 of the wheel 28.

Spaced apart an angular distance equal to the angular spacing between the posts 54 are a plurality of radially outwardly extending, spaced apart wheel indicator unit teeth 72 for driving engagement with a single tooth 74 formed on a suitable driving member 76. A recess 78 in the drive member 76 is engaged by a key 80 which protrudes outwardly from the center portion 82 which is operatively attached to the advancing lever 24. The key 80 and recess 82 comprise the non-circular shape of the shank 50 referred to above.

The exterior circumferences, pitch lines, etc. of the teeth 72, 74 are arranged so that each complete 360° rotation of the driving member 76 will advance the wheel 28 an angular distance equal to the distance between successive teeth 72 on the indicator wheel unit 28. Since this distance coincides with the angular width of a detent, and since the tongue 62 is resiliently biased to the position shown in FIG. 3, it will be understood that the wheel 28 will be indexed to a desired position of rotation so that each number 26 thereon may be properly indexed or centered in relation to the window 30 in the cover 20 of the magazine 10.

FIGS. 4 and 5 show an indicator wheel 28 adapted for rotation in a direction opposite to the intended rotational direction of the wheel 28, but otherwise the same. Only the tongue portion 62 is different from its counterpart.

Preferably, the front cover 20 of the magazine 10 is made of a stiff but resilient, somewhat lubricous plastic material and accordingly, the posts 54 which are integrally formed with the cover 20 are also of the same material. The indicator unit 28 is also preferably of a plastic material, and the lubricous nature of this material permits easy rotation of the wheel 28, while the resiliency thereof permits snapping of the wheel 28 into position with the ears 56 overlying the relieved margin 66 for retention of the indicator unit 28 in place both during assembly and operation of the magazine 10.

In use, numbers 26 on the wheel indicator unit 28 are successively snapped firmly but releasably into the desired position by the spring action of the tongue 62 engaging the detents 60 formed between posts 54. Proper engagement of the tooth 74 with the teeth 72 is further insured by reason of the fact that the wheel indicator unit 28 and the driving member 76 are engaged on respective axial face portions thereof by the forwardly facing end surfaces of the spools 38, 44.

A blade supply indicator assembly made in accordance with the present invention provides the advantages of economy, simplicity, easy assembly, as well as the other advantages referred to herein. Accordingly, it will thus be seen that the present invention provides a novel blade supply indicator unit for a razor magazine which achieves the object set forth herein and others which are inherent in the invention.

I claim:

1. An indicator mechanism for a ribbon-type razor comprising, in combination, a toothed wheel indicator unit having a plurality of spaced apart teeth on an exterior surface thereof for engagement by a driving tooth of an associated rotatable drive member having a blade advancing lever operatively attached thereto, indicia on one face of said indicator unit for indicating the number of shaving edges remaining in a blade supply portion of said razor, mounting means rotatably supporting said indicator unit by engaging said unit on at least portions of an inner surface thereof, said mounting means including, on a radially outer portion thereof, means defining a plurality of detents, one for each desired rotational position of said indicator unit, and an inwardly extending resilient tongue integrally formed on said inner surface of said indicator unit for positioning said indicator unit in a desired position of rotation for display of one of said indicia by successive engagement of said tongue with each of said plurality of detents as said indicator unit is advanced to a series of successive positions.

2. An indicator mechanism as defined in claim 1 in which said mounting means includes at least one axially extending mounting post having a radially outwardly extending, deformable ear thereon for engaging an axially facing portion of said indicator unit for preventing axial movement of said indicator during assembly thereof.

3. An indicator mechanism as defined in claim 1 which further includes a drive member comprising a rotatable unit having a single tooth thereof for engagement with one of said teeth on said indicator unit for advancing said indicator unit to the next advanced position of rotation for each revolution of said drive member.

4. An indicator mechanism as defined in claim 1 in which said mounting means comprises a plurality of spaced apart, axially extending posts, each two adjacent posts defining a detent therebetween.

5. An indicator mechanism as defined in claim 2 in which said indicator unit includes, adjacent a radially inner margin thereof, a relieved surface for receiving said ears.

6. An indicator mechanism as defined in claim 1 in which said posts and said teeth on said indicator unit are spaced equal angular distances apart.

7. In combination, an indicator mechanism as defined in claim 1, and a take-up spool for a ribbon-type razor blade, a supply spool having a supply of ribbon-type blade thereon, said blade extending to said take-up spool, and an advancing lever associated with said take-up spool, said drive member being associated with said take-up spool and said indicator unit being mounted concentrically, but free from driving engagement with, said supply spool.

References Cited

UNITED STATES PATENTS

| 3,364,571 | 1/1968 | Perry | 30—40.1 XR |
| 3,375,577 | 4/1968 | Douglass et al. | 30—40.1 XR |
| 3,375,578 | 4/1968 | Nissen | 30—40.1 |
| 3,421,219 | 1/1969 | Nissen | 30—40.1 XR |
| 3,456,342 | 7/1969 | Dawidowicz et al. | 30—40.1 |

LOUIS J. CAPOZI, Primary Examiner

U.S. Cl. X.R.

30—40.1; 116—133